(12) United States Patent
Jain et al.

(10) Patent No.: US 11,526,584 B2
(45) Date of Patent: Dec. 13, 2022

(54) APPARATUS, SYSTEMS, AND METHODS FOR ASSIGNING ACCESS PERMISSION TO SOCIAL MEDIA

(71) Applicant: International Business Machines Corporation, Armonk, NY (US)

(72) Inventors: Abhishek Jain, Baraut (IN); Sasikanth Eda, Vijayawada (IN); Sandeep Ramesh Patil, Pune (IN); Sachin Chandrakant Punadikar, Pune (IN)

(73) Assignee: International Business Machines Corporation, Armonk, NY (US)

( * ) Notice: Subject to any disclaimer, the term of this patent is extended or adjusted under 35 U.S.C. 154(b) by 24 days.

(21) Appl. No.: 16/601,117

(22) Filed: Oct. 14, 2019

(65) Prior Publication Data
US 2021/0110003 A1 Apr. 15, 2021

(51) Int. Cl.
*G06F 21/10* (2013.01)
*G06F 21/57* (2013.01)
*G06F 21/55* (2013.01)

(52) U.S. Cl.
CPC ............ *G06F 21/10* (2013.01); *G06F 21/552* (2013.01); *G06F 21/57* (2013.01); *H04L 2463/101* (2013.01)

(58) Field of Classification Search
CPC ........ G06F 21/10; G06F 21/552; G06F 21/57; G06Q 50/01; H04L 51/14; H04L 51/32; H04L 2463/101
See application file for complete search history.

(56) References Cited

U.S. PATENT DOCUMENTS

| 9,824,145 | B1 * | 11/2017 | Rohrweck | G06F 16/24578 |
| 2014/0122622 | A1 * | 5/2014 | Castera | H04L 51/04 709/206 |
| 2015/0163184 | A1 | 6/2015 | Kanter et al. | |
| 2015/0312200 | A1 * | 10/2015 | Brav | G06F 40/253 709/206 |
| 2016/0012739 | A1 * | 1/2016 | Jafari | G09B 5/06 709/204 |

(Continued)

FOREIGN PATENT DOCUMENTS

WO WO2018/034594 A1 2/2018

OTHER PUBLICATIONS

Amanda Dennett • Surya Nepal • Cecile Paris • Bella Robinson; TweetRipple: Understanding Your Twitter Audience and the Impact of Your Tweets; 2016 IEEE 2nd International Conference on Collaboration and Internet Computing (CIC) (pp. 256-265); (Year: 2016).*

(Continued)

*Primary Examiner* — Jahangir Kabir
*Assistant Examiner* — Chao Wang
(74) *Attorney, Agent, or Firm* — Kunzler Bean & Adamson

(57) ABSTRACT

Methods that can assign access permission to social media are disclosed herein. One method includes determining, by a processor, an impact of a plurality of impacts on an owner of a social media post, the impact based on a follower of the social media post, and assigning a permission of a plurality of permissions to the follower for accessing the social media post based on the determined impact. Apparatus, systems, and computer program products that can include, perform, and/or implement the methods are also disclosed herein.

20 Claims, 10 Drawing Sheets

(56) References Cited

U.S. PATENT DOCUMENTS

| | | | |
|---|---|---|---|
| 2017/0180290 A1 | 6/2017 | Sardela Bianchi et al. | |
| 2018/0033055 A1* | 2/2018 | Stewart | G06Q 50/01 |
| 2019/0065748 A1 | 2/2019 | Foster et al. | |
| 2020/0153777 A1* | 5/2020 | Jeong | G06N 3/08 |

OTHER PUBLICATIONS

Jianghua Huang • Changjian Wang • Majing Su • Qiong Dai • Md Zakirul Alam Bhuiyan; Inspecting Influences on Likes and Comments of Photos in Instagram; 2018 IEEE Smartworld, Ubiquitous Intelligence & Computing, Advanced & Trusted Computing, Scalable Computing & Communications; (Year: 2018).*

Regina E. Lundgren • Andrea H. McMakin; Social Media; Wiley—IEEE Press 2018 (Edition: 6, pp. 544); (Year: 2018).*

Diamantopoulos et al., "A System-level Transprecision FPGA Accelerator for BLSTM with On-chip Memory Reshaping," 2018 International Conference on Field-Programmable Technology (FPT), pp. 341-344.

Canziani et al., "An Analysis of Deep Neural Network Models for Practical," https://arxiv.org/abs/1605.07678, Apr. 14, 2017, 7 pgs.

Xu et al., "Scaling for edge inference of deep neural networks," https://vast.cs.ucla.edu/publications/scaling-edge-inference-deep-neural-networks, Nature Electronics, vol. 1, pp. 216-222, Apr. 2018.

Sze et al.,"Efficient Processing of Deep Neural Networks: A Tutorial and Survey," https://scholar.google.com/scholar?q=Efficient+Processing+of+Deep+Neural+Networks:+A+Tutorial+and+Survey,+Vivienne+Sze,+et.al.+arXiv.org+2017&hl=en&as_sdt=0&as_vis=1&oi=scholar, arXiv:1703.09039v2 [cs.CV], Aug. 13, 2017, pp. 1-32.

Unknown, "NVIDI TensorRT," https://developer.nvidia.com/tensorrt, printed Jul. 23, 2019, 10 pgs.

D. Boyd, "Networked Privacy", Personal Democracy Forum 2011, Jun. 6, 2011, pp. 1-4.

* cited by examiner

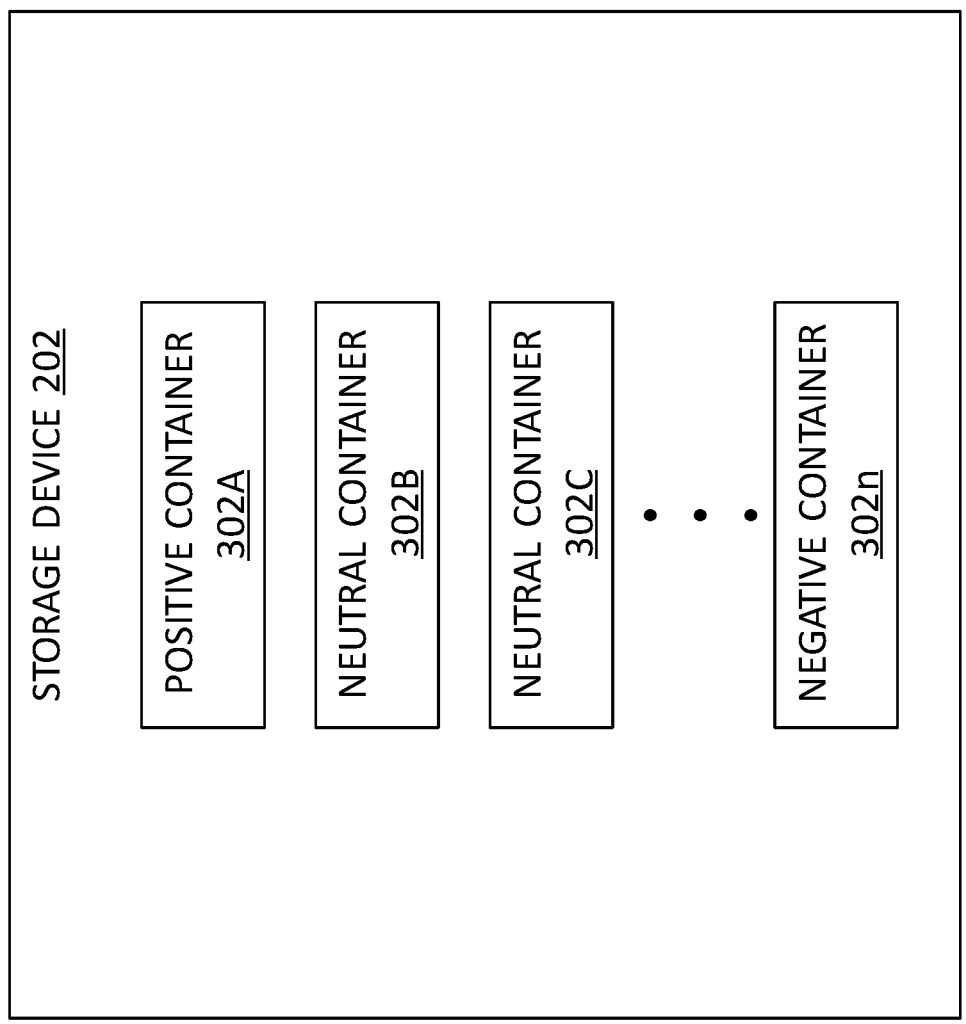

APPARATUS, SYSTEMS, AND METHODS FOR ASSIGNING ACCESS PERMISSION TO SOCIAL MEDIA

FIELD

The subject matter disclosed herein relates to computing systems and, more particularly, relates to apparatus, systems, and methods that can assign access permission to social media.

BACKGROUND

Social media can be considered a breakthrough in providing a platform for connecting people and/or entities. With the rapid technological advancements and growth in popularity, social networking communities have evolved as a source for broadcast and unicast based communications. While social networking can provide numerous advantages, there are at least some drawbacks to utilizing social media. For example, social media posts and/or comments made on social media posts can be and often are a permanent record.

While a permanent record of social media posts and/or comments made thereon is not necessarily a negative thing, a permanent record can present at least some issues, at least when it comes to a person's or entity's online brand and/or image. For example, a negative comment left on a social media post about the owner of the social media post, the content(s) of the social media post, and/or the subject matter of the social media post, etc. can be a permanent record that has the potential to permanently and/or irreparably damage the online brand and/or image of the owner of the social media post. Thus, owners of social media posts need a way to protect their online brand and/or image from being damaged by negative comments.

BRIEF SUMMARY

Apparatus, systems, and methods that can assign access permission to social media are provided. One apparatus includes an impact module that determines an impact of a plurality of impacts on an owner of a social media post, the impact based on a follower of the social media post, and a permission module that assigns a permission of a plurality of permissions to the follower for accessing the social media post based on the determined impact. In additional or alternative embodiments, at least a portion of the impact module and/or the permission module includes one or more of a set of hardware circuits, a set of programmable hardware devices, and/or executable code stored on a set of non-transitory computer-readable storage media.

Methods that can assign access permission to social media are also disclosed herein. One method includes determining, by a processor, an impact of a plurality of impacts on an owner of a social media post, the impact based on a follower of the social media post, and assigning a permission of a plurality of permissions to the follower for accessing the social media post based on the determined impact.

One computer program product includes a computer-readable storage medium including program instructions embodied therewith. The program instructions are executable by a processor to cause the processor to determine an impact of a plurality of impacts on an owner of a social media post, the impact based on a follower of the social media post, and assign a permission of a plurality of permissions to the follower for accessing the social media post based on the determined impact.

BRIEF DESCRIPTION OF THE DRAWINGS

So that at least some advantages of the technology may be readily understood, more particular descriptions of the embodiments briefly described above are rendered by reference to specific embodiments that are illustrated in the appended drawings. Understanding that the drawings included herein only depict some embodiments, the embodiments discussed herein are therefore not to be considered as limiting the scope of the technology. That is, the embodiments of the technology that are described and explained herein are done with specificity and detail utilizing the accompanying drawings, in which:

FIG. 3 is a block diagram of one embodiment of a storage device included in the social media system of FIG. 2;

DETAILED DESCRIPTION

Figure 1:
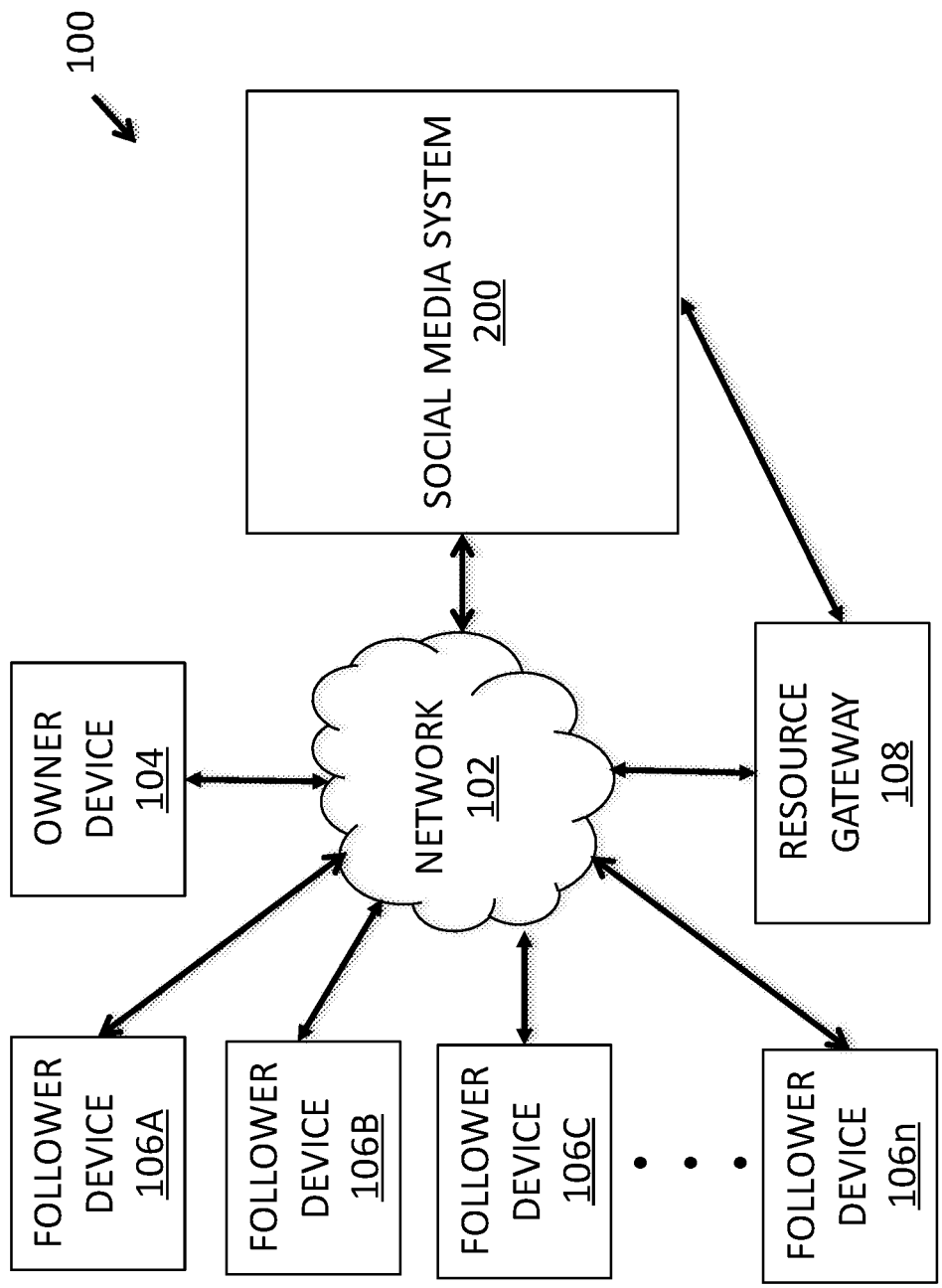
FIG. 1 is a block diagram of one embodiment of a computing system (or computing device) for assigning access permission to social media (e.g., a social media page and/or social media post)

Disclosed herein are various embodiments providing apparatus, systems, methods, and computer program products that can assign access permission to social media. Notably, the language used in the present disclosure has been principally selected for readability and instructional purposes, and not to limit the scope of the subject matter disclosed herein in any manner.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "including," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more," unless expressly specified otherwise.

In addition, as used herein, the term "set" can mean "one or more," unless expressly specified otherwise. The term "sets" can mean multiples of or a plurality of "one or mores," "ones or more," and/or "ones or mores" consistent with set theory, unless expressly specified otherwise.

Further, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

The present technology may be a system, a method, and/or a computer program product. The computer program product may include a computer-readable storage medium (or media) including computer-readable program instructions thereon for causing a processor to carry out aspects of the present technology.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory ("RAM"), a read-only memory ("ROM"), an erasable programmable read-only memory ("EPROM" or Flash memory), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove including instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fibre-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibres, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present technology may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). To perform aspects of the present technology, in some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry.

Aspects of the present technology are described herein with reference to flowchart illustrations and/or block diagrams of methods, apparatus (systems), and computer program products according to embodiments of the technology. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium including instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present technology. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

To more particularly emphasize their implementation independence, many of the functional units described in this specification have been labeled as modules. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program instructions may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

The schematic flowchart diagrams and/or schematic block diagrams in the Figures illustrate the architecture, functionality, and operation of possible implementations. It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Although various arrow types and line types may be employed in the flowchart and/or block diagrams, they are understood not to limit the scope of the corresponding embodiments. Indeed, some arrows or other connectors may be used to indicate only an exemplary logical flow of the depicted embodiment.

The description of elements in each figure below may refer to elements of proceeding figures. For instance, like numbers can refer to similar elements in all figures, including alternate embodiments of similar elements.

With reference now to the drawings, FIG. 1 is a block diagram of one embodiment of a computing system 100 that can assign access permission to social media. At least in the illustrated embodiment, the computing system 100 includes, among other components, a network 102 connecting an owner device 104, a set of follower devices 106 (e.g., follower device 106A, 106B, 106D, . . . 106n (also simply referred individually, in various groups, or collectively as follower device(s) 106)), a resource gateway 108, and a social media system 200. The network 102 may be any suitable wired and/or wireless network 102 (e.g., public and/or private computer networks in any number and/or configuration (e.g., the Internet, an intranet, a cloud network, etc.)) that is known or developed in the future that enables the owner device 104, the follower device(s) 106, the resource gateway 108, and the social media system 200 to be coupled to and/or in communication with one another and/or to share resources. In various embodiments, the network 102 can comprise the Internet, a cloud network (IAN), a SAN (e.g., a storage area network, a small area network, a server area network, and/or a system area network), a wide area network (WAN), a local area network (LAN), a wireless local area network (WLAN), a metropolitan area network (MAN), an enterprise private network (EPN), a virtual private network (VPN), and/or a personal area network (PAN), among other examples of computing networks and/or or sets of computing devices connected together for the purpose of sharing resources that are possible and contemplated herein.

An owner device 104 can include any suitable computing hardware and/or software (e.g., a thick client, a thin client, or hybrid thereof) capable of accessing the social media system 200 via the network 102. An owner device 104, as part of its respective operation, relies on sending input/output (I/O) requests to the social media system 200 to read data, write data, and/or modify data. Specifically, the owner device 104 can transmit I/O requests to read, write, store, communicate, propagate, and/or transport instructions, data, computer programs, software, code, routines, etc., to the social media system 200 and may comprise at least a portion of a client-server model. In general, the social media system 200 can be accessed by the owner device 104 and/or communication with the social media system 200 can be initiated by the owner device 104 through a network socket utilizing one or more inter-process networking techniques.

In various embodiments, an owner device 104 can create, maintain, and modify a social media account on the social media system 200. For example, an owner device 104 can enable an entity (e.g., an owner) that owns an owner device 104 to create a social media page 500 (e.g., social media page 500A and 500B in FIGS. 5A and 5B, respectively (also simply referred individually, in various groups, or collectively as social media page(s) 500)), provide one or more social media posts 502 (or simply post(s) 502, see FIGS. 5A and 5B) to the social media page 500 for display thereon, and modify the content on the social media page 500 and/or social media post(s) 502.

A social media account can be owned and/or authored by one or more entities (e.g., one or more persons, one or more companies, one or more organizations, and/or one or more groups, etc.), In other words, an owner of a social media account can include one or more entities that can control and/or author the content of a social media account.

While the embodiment illustrated in FIG. 1 includes one (1) owner device 104, the various embodiments of the computing system 100 are not limited to a single owner device 104. That is, various other embodiments may include a greater quantity of owner devices 104 than one owner device 104. In other words, other embodiments of the computing system 100 may include multiple owner devices 104, which can include any suitable quantity, of owner devices 104.

Further, an owner device 104 can enable an owner of the owner device 104 to view and/or provide comments on the social media post(s) of one or more other social media accounts that are owned by a different entity and/or owner. For example, an entity and/or owner using an owner device 104 can view and/or make comments to the social media post(s) on the social media page(s) of the social media accounts owned by the owner of one or more other owner devices 104. As such, an owner device 104 can also be a follower device 106 and the owner of an owner device 104 can also be a follower.

A follower device 106 can include any suitable computing hardware and/or software (e.g., a thick client, a thin client, or hybrid thereof) capable of accessing the social media system 200 via the network 102. Each follower device 106, as part of its respective operation, relies on sending I/O requests to the social media system 200 to read data and/or write data. That is, each follower device 106 can transmit I/O requests to read and/or write data to the social media system 200. In general, the social media system 200 can be accessed by the follower device(s) 106 and/or communication with the social media system 200 can be initiated by the follower device(s) 106 through a network socket utilizing one or more inter-process networking techniques.

A follower device 106 can be owned by one or more entities (e.g., one or more persons, one or more companies, one or more organizations, and/or one or more groups, etc.). In other words, the owner of a follower device 106 can include one or more entities that can control the activities of the follower device 106, As used herein, the owner of a follower device 106 (e.g., a follower) can be a follower of the owner(s) of one or more social media accounts, one or more social media pages 500, and/or one or more social media posts 502. Specifically, a follower device 106 can enable a follower to view and/or provide one or more comments to one or more social media pages 500 and/or the social media post(s) 502 provided on the social media page(s) 500. For example, an entity and/or owner using a follower device 106 (e.g., a follower) can view and/or make comments to the social media page(s) 500 and/or social media post(s) 502 on the social media account of the owner of an owner device 104. As discussed below, one or more follower devices 106 may be restricted in its/their ability to comment on one or more social media accounts, one or more social media pages 500, and/or one or more social media posts 502 associated with and/or corresponding to the owner of an owner device 104.

Further, a follower (e.g., the owner of a follower device 106) may also be the owner and/or author of a social media account, one or more social media pages, and/or one or more social media posts on the social media system 200. As such, a follower can also be the owner of an owner device 104 and/or a follower device 106 can also be an owner device 104.

While the embodiment illustrated in FIG. 1 includes four (4) follower devices 106, the various embodiments of the computing system 100 are not limited to four follower devices 106. That is, various other embodiments may include more than four follower devices 106 or less than four follower devices 106. In other words, the various embodiments of the computing system 100 may include any suitable quantity of follower devices 106.

A resource gateway 108 may include any suitable hardware and/or software than can enable the social media system 200 to communicate and/or exchange data with one or more external computing systems and/or computing devices. The resource gateway 108 may be directly coupled/connected to the social media system 200 and/or the social media system 200 can access the resource gateway 108 via the network 102.

The external computing system(s) and/or computing device(s) can include and/or store information/data about one or more of the entities that own the follower device(s) 106. In various embodiments, a resource gateway 108 can connect the social media system 200 to the Internet. Connection to the Internet can allow the social media system 200 to access information and/or data about the one or more of the entities that own the follower device(s) 106 from one or more resources and/or sources on the World Wide Web (WWW). For example, a resource gateway 108 can allow the social media system 200 to access, view, and/or search one or more external social media systems (e.g., one or more social media websites). Specifically, the resource gateway 108 can allow the social media system 200 to access, view, and/or search the social media page(s) for the one or more entities that own the follower device(s) 106 to determine the content thereon and/or can allow the social media system 200 to access, view, and/or search for any comments made by the one or more the entities that own the follower device(s) 106 on the external social media system(s) to determine the content thereof, as discussed elsewhere herein.

Figure 2:
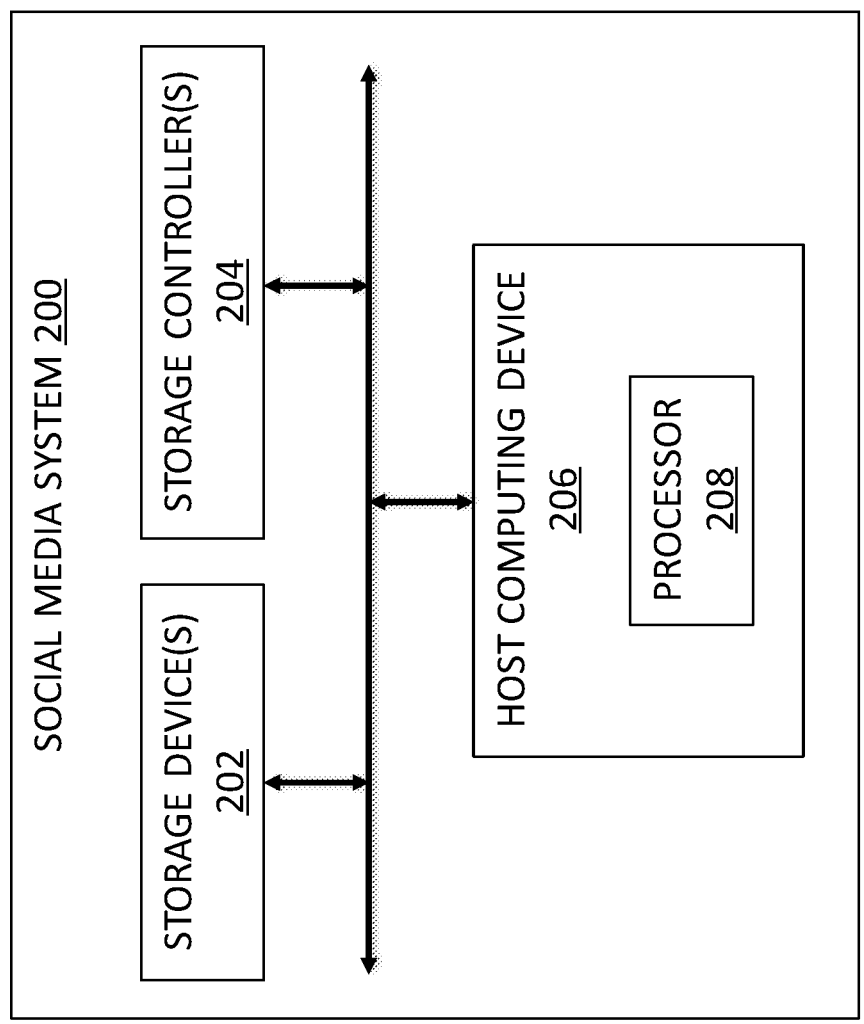
FIG. 2 is a block diagram of one embodiment of a social media system (or social media device) included in the computing system of FIG. 1.

Referring to FIG. 2, FIG. 2 is a block diagram of one embodiment of a social media system 200. At least in the illustrated embodiment, a social media system 200 includes, among other components, a set of storage devices 202, a set of storage controllers 204, and a host computing device 206 that includes a processor 208 coupled to and/or in communication with one another.

A storage device 206 may be any suitable type of device and/or system that is known or developed in the future that can store computer-useable data. In various embodiments, a storage device 202 may include one or more non-transitory computer-usable mediums (e.g., readable, writable, readable-writable, etc.), which may include any non-transitory and/or persistent apparatus or device that can contain, store, communicate, propagate, and/or transport instructions, data, computer programs, software, code, routines, etc., for processing by or in connection with a computer processing device.

Further, communication between a storage device 202 and a storage controller 204 may be employed using any suitable type of communication architecture and/or protocol that is known or developed in the future capable of enabling multiple computing devices and/or nodes to communicate with one another. Examples of suitable communication architectures and/or protocols include, but are not limited to, InfiniBand (IB), Remote Direct Memory Access (RDMA), D3 over RDMA Internet Protocol (IP), Transmission Control Protocol/Internet Protocol (TCP/IP), Ethernet, Fibre Channel (FC), Advanced Technology Attachment (ATA), ATA-over-Ethernet (AoE), parallel ATA (PATA), Serial ATA (SATA), Small Computer System Interface (SCSI), Internet Small Computer System Interface (iSCSI), an optical network, Network File System (NFS), FC-over-IP (FCIP), Non-Volatile Memory Express (NVMe), NVMe-over-RDMA, iSCSI Extensions for RDMA (iSER), SCSI RDMA Protocol (SRP), Fibre Channel-over-Ethernet (FCoE), Enterprise Systems Connection (ESCON), Fibre Connection (FICON), ATA-Over-Ethernet (AoE), and/or Internet Fibre Channel Protocol (IFCP), etc., among other examples of communication architectures and/or protocols and combinations thereof that are possible and contemplated herein.

In some embodiments, a set of storage devices 202 may include a set of computer-readable, computer-writable, and/or computer-useable disks (e.g., disk drives, hard drives, hard disk drives (HDDs), etc.). The set of disks may be arranged to implement a redundant array of independent disks (RAID) configuration, a just of bunch of disks (JBOD) configuration, a concatenation (SPAN or BIG) configuration, or a massive array of idle drives (MAID) configuration, etc., among other suitable disk architectures and/or configurations that are known or developed in the future. In various embodiments, the set of storage devices 202 can be configured to store data and/or migrate stored data between two or more storage devices 202.

A set of storage devices 202, in various embodiments, is configured to store a social media account for each of the one or more entities that own an owner device 104 and/or a social media account for each of the one or more entities that own a follower device 106. A social media account can include one or more social media pages 500 (e.g., social media pages 500A and 500B in FIGS. 5A and 5B, respectively) upon which the owner(s) can provide one or more social media posts 502 thereon (e.g., text, pictures, videos, artwork, graphics, literature, internal and/or external links, news, advertisements, sayings, slogans, conversations, and/or calendars, etc., among other information and/or data that is possible and contemplated herein) (see FIGS. 5A and 5B). In addition, a social media page 500 can further enable a set of followers (e.g., follower A, follower B, follower C, and follower D in FIG. 5A and/or FIG. 5B) to leave and/or make comments 504 (e.g., comment 504A, comment 504B, comment 504C, and comment 504D in FIG. 5A and/or FIG. 5B (also simply referred individually, in various groups, or collectively as comment(s) 504)) thereon. That is, a set of storage devices 202 can store and enable the display of the social media page(s) 500. Further, the set of storage devices 202 can store any modifications made to the contents posted on the social media page(s) 500 (e.g., via the owner device 104) and/or store any comments 504 made on the social media page(s) 500 (e.g., via the follower device(s) 106).

In various embodiments, one or more storage devices 202 can be partitioned and/or configured to include a set of containers. With reference to FIG. 3, FIG. 3 is a block diagram of one embodiment of a storage device 202 including a set of containers 302. At least in the illustrated embodiment, the storage device 202 includes, among other components, a positive container 302A, a neutral container 302B, a neutral container 302C, and a negative container 302n (also simply referred individually, in various groups, or collectively as container(s) 302).

Figure 5A:
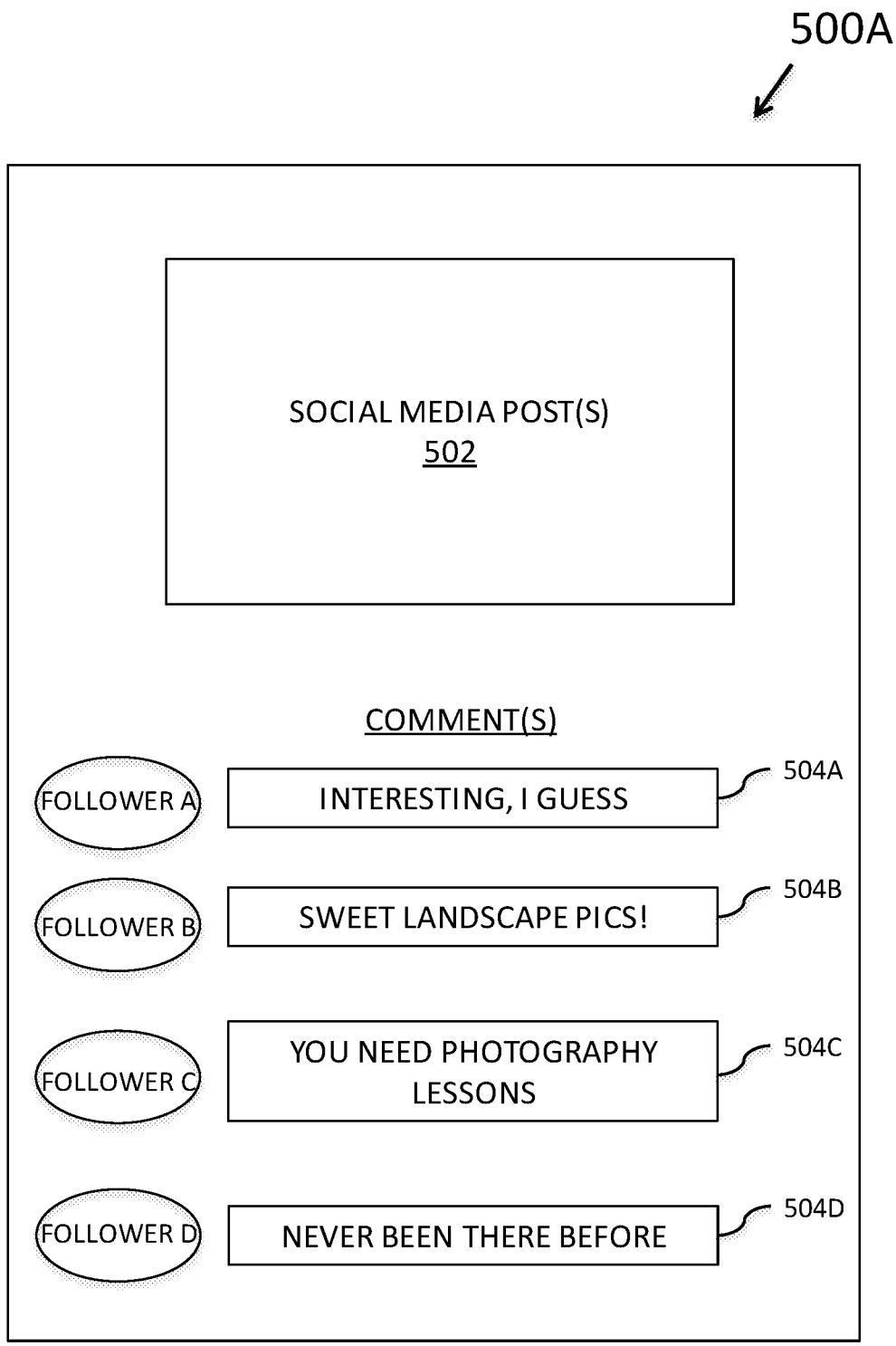
FIG. 5A is a block diagram of a non-limiting example social media page in accordance with one embodiment of the social media system of FIG. 2.
Figure 5B:
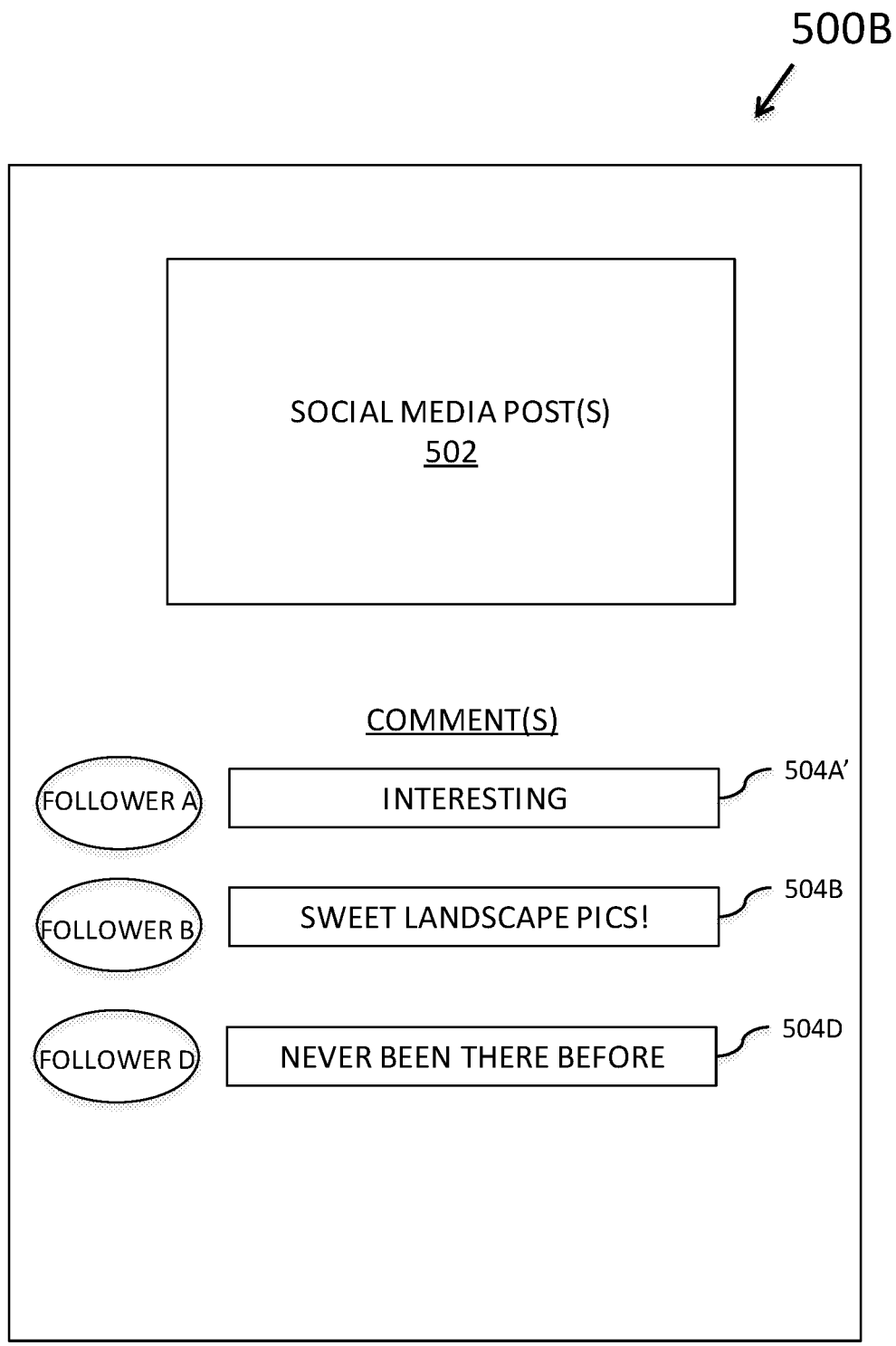
FIG. 5B is a block diagram of a non-limiting example social media page in accordance with another embodiment of the social media system of FIG. 2.

A container 302 is configured to store a list of one or more followers (e.g., the owner(s) of a follower device 106) of an entity that owns a social media page 500 and/or one or more social media posts 502 (e.g., follower A, follower B, follower C, and follower D in FIG. 5A and/or FIG. 5B). A follower is assigned to a container based on a historical profile generated for the particular follower.

In various embodiments, a follower is assigned to a container 302 that is associated with and/or corresponds to an attitude included in the historical profile for a particular follower, as discussed elsewhere herein. In some embodiments, a follower with a positive attitude in a historical profile may be listed in the positive container 302A, a follower with a neutral attitude in a historical profile may be listed in the neutral container 302B, a follower with an insufficient historical profile may be listed in the neutral container 302C, and a follower with a negative attitude in a historical profile may be listed in the negative container 302n.

While the embodiment illustrated in FIG. 3 includes four classifications (e.g., positive, neutral, neutral, and negative), the various embodiments are not limited to four classifications. That is, various other embodiments may include more than four classifications or less than four classifications. In other words, the various embodiments may include any suitable quantity of classifications based on any suitable criteria or criterion, as discussed elsewhere herein.

Similarly, while the embodiment illustrated in FIG. 3 includes four containers 302, the various embodiments of the storage device 202 are not limited to four containers 302. That is, various other embodiments may include more than four containers 302 or less than four containers 302. In other words, the various embodiments of the storage device 202 may include any suitable quantity of containers 302 that corresponds to the quantity of classifications.

A storage controller 204 may include non-volatile/persistent hardware and/or software (e.g., a processor) configured to perform and/or facilitate data storage operations on the storage devices 206, including, but not limited to, data migration, data archiving, data backup, data rebuilding, data mirroring, replicating data, etc. For instance, a storage controller 204 may include non-volatile and/or persistent hardware and/or software to perform short-term and/or long-term data storage operations on the storage devices 206, which may include write operations, read operations, read-write operations, data migration operations, etc., among other operations that are possible and contemplated herein.

In various embodiments, a storage controller 204 may include hardware and/or software that can receive I/O requests (e.g., write requests, read requests, and/or read-write requests, etc.) from the owner device 104 (see FIG. 1) and perform corresponding I/O operations (e.g., write operations and read operations, and/or read-write operations, etc.) to the social media page 500 stored on the set of storage devices 204 in response thereto. A storage controller 204 may further include hardware and/or software that can receive I/O requests (e.g., write requests and/or read requests) from the follower device(s) 106 (see FIG. 1) and perform corresponding I/O operations (e.g., read operations (e.g., view a social media page 500) and/or write operations (e.g., write a comment)) to the social media page(s) 500 stored on the set of storage devices 204 in response thereto.

A host computing device 206 may include any hardware and/or software that is known or developed in the future that can perform computing operations. In various embodiments, the host computing device 206 can host a set of social media accounts that include one or more associated social media pages 500 that can be modified by an owner device 104 and/or can allow one or more follower device(s) 106 to provide comments 504 thereon. In some embodiments, a host computing device includes a processor 208 that can assign access permission to a social media post 502 on a social media page 500.

A processor 208 may include any suitable non-volatile/persistent hardware and/or software that can assign access permission to one or more follower devices 106 for accessing social media posts 502. In some embodiments, the processor 208 includes hardware and/or software configured to execute instructions in one or more modules and/or applications that can assign permission to one or more follower devices 106 for accessing a social media post 502 on a social media page 500. The assigned permission can allow, limit, and/or deny the follower device(s) 106 the ability to read and/or write (e.g., provide comment(s) 504) to the social media post 502.

Figure 4A:
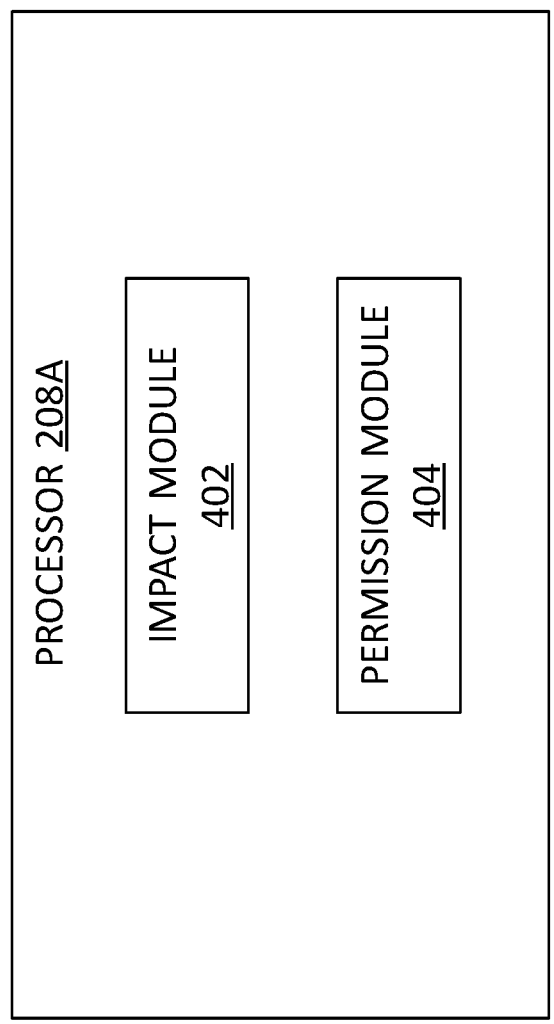
FIG. 4A is a block diagram of one embodiment of a processor included in the social media system of FIG. 2.

Referring to FIG. 4A, FIG. 4A is a block diagram of one embodiment of a processor 208A that can assign access permission to social media posts. At least in the illustrated embodiment, a processor 208A may include, among other components, an impact module 402 and a permission migration module 404 coupled to and/or in communication with one another.

An impact module 402 may include any suitable hardware and/or software that can determine the potential impact of one or more comments 504 posted to a social media page 500 and/or social media post 502 with regards to the owner/author of the social media page 500 and/or social media post 502. In various embodiments, an impact module 402 is configured to determine the impact of the comment(s) 504 to the owner should the comment(s) 504 be posted to and/or displayed on the social media page(s) 500 and/or social media post(s) 502.

In some embodiments, the determined impact can be one or more impacts within a plurality of impacts related to, associated with, and/or corresponding to the owner of a social media account, one or more social media pages 500, and/or one or more social media posts 502. Further, the impact(s) can be determined for the owner with respect to and/or based on one or more followers of the owner, the social media page(s) 500, and/or the social media post(s) 502.

An impact can include any suitable impact that can affect the reputation, brand, and/or image of the owner of a social media account, social media page 500, and/or social media post 502, among other impacts that are possible and contemplated herein. Further, a plurality of impacts can include any suitable quantity of impacts greater than or equal to two (2) impacts.

In some embodiments, an impact module 402 is configured to determine one of two impacts for an owner (e.g., a positive impact and a negative impact). A positive impact can be determined for the owner in response to an estimation that a follower will provide and/or is likely (e.g., with a high degree and/or amount of probability) to provide or post a positive comment about the owner and/or subject matter of a social media page 500 and/or social media post 502. A negative impact can be determined for the owner in response to an estimation that a follower will provide and/or is likely (e.g., with a high degree and/or amount of probability) to provide or post a positive comment about the owner and/or subject matter of a social media page 500 and/or social media post 502.

In an additional or alternative embodiment, an impact module 402 is configured to determine one of three (3) impacts for an owner (e.g., a positive impact, a neutral impact, and a negative impact). A positive impact can be determined for the owner in response to an estimation that a follower will provide and/or is likely (e.g., with a high degree and/or amount of probability) to provide or post a positive comment about the owner and/or subject matter of a social media page 500 and/or social media post 502. A neutral impact can be determined for the owner in response to an estimation that a follower will provide and/or is likely (e.g., with a high degree and/or amount of probability) to provide or post a neutral comment about the owner and/or subject matter of a social media page 500 and/or social media post 502 and/or there is an insufficient amount of data and/or information (e.g., quantity of comments and/or quantity of social media posts) about the owner and/or subject matter of the social media page 500 and/or social media post 502 with respect to the follower to determine whether the follower will provide and/or is likely to provide a positive or negative comment. A negative impact can be determined for the owner in response to an estimation that a follower will provide and/or is likely (e.g., with a high degree and/or amount of probability) to provide or post a negative comment about the owner and/or subject matter of a social media page 500 and/or social media post 502.

In further additional or alternative embodiments, an impact module 402 is configured to determine one of four impacts for an owner (e.g., a positive impact, a first neutral impact, a second neutral impact, and a negative impact). A positive impact can be determined for the owner in response to an estimation that a follower will provide and/or is likely (e.g., with a high degree and/or amount of probability) to provide or post a positive comment about the owner and/or subject matter of a social media page 500 and/or social media post 502. One neutral impact (e.g., a neutral-neutral impact) can be determined for the owner in response to an estimation that a follower will provide and/or is likely (e.g., with a high degree and/or amount of probability) to provide or post a neutral comment about the owner and/or subject matter of a social media page 500 and/or social media post 502. Another neutral impact (e.g., a neutral-unknown impact) can be determined for the owner in response to an insufficient amount of data and/or information (e.g., quantity of comments and/or quantity of social media posts) being available about the owner and/or subject matter of the social media page 500 and/or social media post 502 with respect to the follower to determine whether the follower will provide and/or is likely to provide a positive or negative comment. A negative impact can be determined for the owner in response to an estimation that a follower will provide and/or is likely (e.g., with a high degree and/or amount of probability) to provide or post a negative comment about the owner and/or subject matter of a social media page 500 and/or social media post 502.

Other embodiments of an impact module 402 may include greater quantities of impacts. Here, a greater quantity of impacts can include finer grained classifications and/or definitions of positive, neutral, and/or negative impacts on an owner.

A permission module 404 may include any suitable hardware and/or software that can assign one or more permissions to a follower. In various embodiments, a permission module 404 in configured to assign one of a plurality of access permissions for accessing a social media page 500 and/or social media post 502 to a follower and/or a follower device 106 (also simply referred to herein individually or collectively, as a follower).

An access permission can include any suitable access and/or permissions that can allow, limit, and/or deny the performance of one or more activities on a social media page 500 and/or social media post 502. An access permission; in some embodiments, can enable and/or allow a follower to perform one or more activities on a social media page 500 and/or social media post 502. In additional or alternative embodiments, an access permission can limit and/or deny a follower to perform one or more activities on a social media page 500 and/or social media post 502. Further, a plurality of access permissions can include any suitable quantity of access permissions greater than or equal to two access permissions.

In some embodiments, a permission module 404 is configured to assign one of two access permissions (e.g., a read-write permission or a read permission, among other permissions that are possible and contemplated herein) to a follower. A read-write permission can be assigned to a follower in response to a determination that a comment that will be posted and/or is likely to be posted by the follower a social media page 500 and/or social media post 502 will have a positive impact on the owner of the social media page 500 and/or social media post 502. A read-write permission, in various embodiments; can allow the follower to read the social media page 500 and/or social media post 502 and post/make/provide one or more comments 504 on the social media page 500 and/or social media post 502.

A read permission can be assigned to a follower in response to a determination that a comment that will be posted and/or is likely to be posted by the follower a social media page 500 and/or social media post 502 will have a negative impact on the owner of the social media page 500 and/or social media post 502. A write permission, in various embodiments, can allow the follower to read the social media page 500 and/or social media post 502, but denies the ability of the follower to post/make/provide any comments 504 on the social media page 500 and/or social media post 502 (e.g., a read only permission).

In additional or alternative embodiments, a permission module 404 is configured to assign one of three access permissions (e.g., a read-write permission, read-partial write permission, or a read permission, among other permissions that are possible and contemplated herein) to a follower. Here, a read-write permission and a read permission can be assigned to a follower in response to a determination that a comment that will be posted and/or is likely to be posted by the follower a social media page 500 and/or social media post 502 will have a positive impact or a negative impact, respectively, on the owner of the social media page 500 and/or social media post 502, as discussed above.

A read-partial write permission, in various embodiments, can be assigned to a follower in response to a determination that a comment that will be posted and/or is likely to be posted by the follower a social media page 500 and/or social media post 502 will have a neutral-neutral impact or a neutral-unknown impact on the owner of the social media page 500 and/or social media post 502. A read-partial write permission can allow the follower to read the social media page 500 and/or social media post 502 and limit the ability of the follower to post/make/provide any comments 504 on the social media page 500 and/or social media post 502, For example, the follower may be allowed a limited quantity of comments, a limited quantity of words, and/or a limited quantity of characters that the follower can post to the social media page 500 and/or social media post 502, among other possible limits and/or partial writes that are possible and contemplated herein.

In further additional or alternative embodiments, a permission module 404 is configured to assign one of four access permissions (e.g., a read-write permission, a first read-partial write permission, a second read-partial write permission, or a read permission, among other permissions that are possible and contemplated herein) to a follower. Here, a read-write permission and a read permission can be assigned to a follower in response to a determination that a comment that will be posted and/or is likely to be posted by the follower a social media page 500 and/or social media post 502 will have a positive impact, or a negative impact, respectively, on the owner of the social media page 500 and/or social media post 502, as discussed above.

A first read-partial write permission can be assigned to a follower in response to a neutral-neutral impact on the owner. A first read-partial write permission can allow the follower to read the social media page 500 and/or social media post 502 and limit the ability, of the follower to post/make/provide any comments 504 on the social media page 500 and/or social media post 502. For example, the follower may be allowed a limited quantity of comments, a limited quantity of words, and/or a limited quantity of characters that the follower can post to the social media page 500 and/or social media post 502, among other possible limits and/or partial writes that are possible and contemplated herein.

A second read-partial write permission can be assigned to a follower in response to a neutral-unknown impact on the owner. A second read-partial write permission can allow the follower to read the social media page 500 and/or social media post 502 and limit the ability of the follower to post/make/provide any comments 504 on the social media page 500 and/or social media post 502. For example, the follower may be allowed a limited quantity of comments, a limited quantity of words, and/or a limited quantity of characters that the follower can post to the social media page 500 and/or social media post 502, among other possible limits and/or partial writes that are possible and contemplated herein.

In some embodiments, the first read-partial write permission and the second read-partial write permission include one or more of the same limited quantity of comments, the same limited quantity of words, and/or the same limited quantity of characters that the follower can post to the social media page 500 and/or social media post 502. In alternative embodiments, the first read-partial write permission and the second read-partial write permission include one or more different limited quantity of comments, different limited quantity of words, and/or different limited quantity of characters that the follower can post to the social media page 500 and/or social media post 502. In some embodiments, the first read-partial write permission includes a greater limited quantity of comments, a greater limited quantity of words, and/or a greater limited quantity of characters. In other embodiments, the second read-partial write permission includes a greater limited quantity of comments, a greater limited quantity of words, and/or a greater limited quantity of characters.

Other embodiments of a permission module 404 may include greater quantities of access permissions. Here, a greater quantity of access permissions can include finer grained limitations of positive permissions, neutral permissions, and/or negative permissions for a follower. In some embodiments, a follower may be limited to posting an emoji (e.g., a positive emoji, a neutral emoji, and/or a negative emoji).

In some embodiments, a permission module 404 is configured to assign a full access permission and/or a default access permission to a social media page 500 and/or social media post 502 to a follower in response to a determination that the social media page 500 and/or social media post 502 does not include controversial content and/or subject matter, which default access permission can be any suitable access permission discussed herein. In additional or alternative embodiments, a permission module 404 is configured to assign one of a plurality of access permissions to a social media page 500 and/or social media post 502 to a follower in response to a determination that the social media page 500 and/or social media post 502 includes controversial content and/or subject matter. In some embodiments, the access permission is assigned to the follower based on an estimated response from the follower with respect to the controversial content and/or subject matter.

Figure 4B:
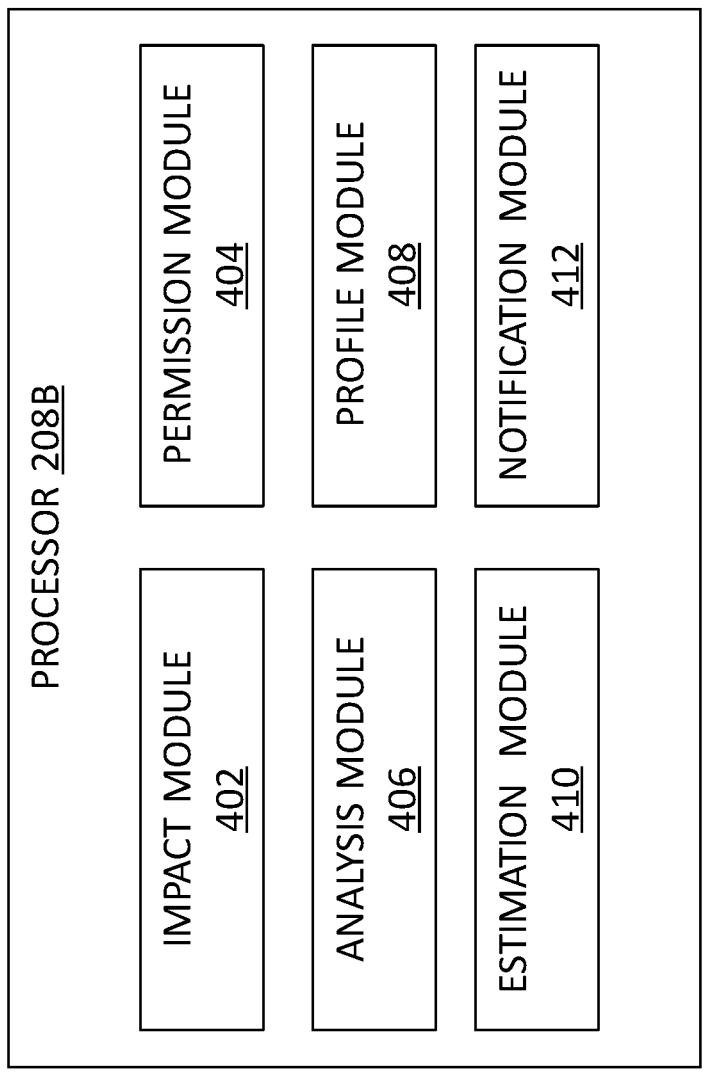
FIG. 4B is a block diagram of another embodiment of a processor included in the social media system of FIG. 2.

With reference to FIG. 4B, FIG. 4B is a block diagram of another embodiment of a processor 208B that can assign access permission to social media posts. A processor 208B can include an impact module 402 and a permission migration module 404 similar to the processor 208A discussed above with reference to FIG. 4A. At least in the illustrated embodiment, the processor 208B can further include, among other elements, an analysis module 406, a profile module 408, an estimation module 410, and a notification module 412.

An analysis module 406 may include any suitable hardware and/or software that can analyze a social media page 500 and/or a social media post 502. In various embodiments, an analysis module 406 can analyze the content of a social media page 500 and/or a social media post 502 to determine whether the content will elicit or is likely to elicit a positive response, a neutral response, and/or a positive response from a follower.

In various embodiments, an analysis module 406 can analyze the content of the social media page 500 and/or social media post 502 based on any suitable rules and/or criteria or criterion that can elicit a positive response, a neutral response, and/or a positive response from a particular follower. In some embodiments, an analysis module 406 can analyze the content of the social media page 500 and/or social media post 502 based on one or more rules/criteria. Example rules/criteria can include, but are not limited to, a post about a celebrity and/or celebrity signature, reference to a particular organization, wearing a specific or particular dress code, costume, or uniform, symbols referencing recent social activities/movements/trends, a post responding to a news reference, event, and/or story, showcasing a future vision, something of a comparative nature (e.g., locations, monuments, culture, religion, politics, sports, leisure activities, etc.), controversial media (e.g., video, pictures, comics, literature, etc.), and/or reference to a quote and/or celebrity wording, etc., among other rules/criteria that can elicit a positive response, a neutral response, and/or a positive response from a follower that are possible and contemplated herein.

Further, the analysis module 406 can perform the analysis of the content of the social media page 500 and/or social media post 502 in view of the scope of the visibility of the social media page 500 and/or social media post 502. In some embodiments, the greater the scope of visibility (e.g., the greater the quantity of entities that can view the social media page 500 and/or social media post 502), the greater the more likely that the content will elicit a positive response, a neutral response, or a negative response from a particular follower. For example, in response to a social media page 500 and/or social media post 502 being visible to a large quantity of entities, an analysis module 406 will place greater weight on the potential positive, neutral, or negative response of the particular follower.

In additional or alternative embodiments, an analysis module 406 is configured to analyze a social media page 500 and/or social media post 502 to determine whether the social media page 500 and/or social media post 502 includes controversial content and/or subject matter. Controversial content and/or subject matter can include any suitable content and/or subject matter that can elicit different and/or polarizing attitudes and/or opinions from different followers. Further, an analysis module 406 can determine whether the content and/or subject matter of a social media page 500 and/or social media post 502 is controversial based on and/or utilizing any one or more of the rules/criteria discussed above.

A profile module 408 may include any suitable hardware and/or software that can generate a historical profile for a follower. A historical profile for a particular follower may include and/or be based on any suitable historical data and/or information about the follower. A historical profile for a particular follower may include any suitable data/information about how the follower feels (e.g., positive attitude, neutral attitude, or negative attitude, etc.) about a particular person, entity, and/or topic.

In various embodiments, a profile module 408 is configured to generate a historical profile for a particular follower based on historical data/information gathered from one or more online resources. Examples of an online resource can include, but are not limited to websites, social media accounts, social media pages, social media posts, comments posted/left by the follower, responses posted/left by the follower, purchases, and/or browsing history, etc., among other online resources that can assist in determining how the follower feels about a particular person, entity, and/or topic.

In some embodiments, a profile module 408 can generate a historical profile for a particular follower that indicates that the follower has a positive attitude, neutral attitude, or negative attitude about a particular person, entity, and/or topic. In additional or alternative embodiments, a profile module 408 can generate a historical profile for a particular follower that indicates that the follower has a positive attitude, neutral attitude, and/or negative attitude about multiple persons, entities, and/or topics. For example, a historical profile can indicate that the follower has a positive attitude toward a first topic and a negative attitude toward a second topic, among other examples that are possible and contemplated herein.

A profile module 408, in various embodiments, in further configured to place and/or assign the follower to a container 302 in a storage device 202 based on the historical profile for the follower. In various embodiments, the follower is assigned to the container 302 that corresponds to the follower's attitude included in the historical profile for the follower.

In some embodiments, a profile module 408 is configured to assign the follower to a positive container 302A in response to determining that the follower will have or is likely to have a positive attitude toward the content of a social media page 500 and/or social media post 502. In additional or alternative embodiments, a profile module 408 is configured to assign the follower to a neutral container 302B in response to determining that the follower will have or is likely to have a neutral attitude toward the content of a social media page 500 and/or social media post 502. In further additional or alternative embodiments, a profile module 408 is configured to assign the follower to a neutral container 302C in response to determining that there is insufficient data and/or information about the follower with respect to the content of a social media page 500 and/or social media post 502. In still further additional or alternative embodiments, a profile module 408 is configured to assign the follower to a negative container 302n in response to determining that the follower will have or is likely to have a negative attitude toward the content of a social media page 500 and/or social media post 502.

An estimation module 410 can include any suitable hardware and/or software that can estimate the response to a social media page 500 and/or social media post 502 by a particular follower. In various embodiments, an estimated response for the follower is based on a nexus of an analysis of the content of the social media page 500 and/or social media post 502 (e.g., performed by an analysis module 406) and a historical profile for the follower.

An estimated response can include any suitable response from the follower with respect to a particular person, entity, and/or topic. In various embodiments, an estimation module 410 can estimate that a particular follower will respond or is likely to respond (e.g., with a high degree and/or amount of probability) with a positive response, a neutral response, or a negative response, among other responses that are possible and contemplated herein.

In some embodiments, an estimation module 410 can estimate a positive response in response to a nexus of an analysis of the content of the social media page 500 and/or social media post 502 and a historical profile for the follower indicating that the follower will author a set of positive comments on a social media page 500 and/or social media post 502. In additional or alternative embodiments, an estimation module 410 can estimate a neutral response in response to a nexus of an analysis of the content of the social media page 500 and/or social media post 502 and a historical profile for the follower indicating that the follower will author a set of neutral comments on the social media page 500 and/or social media post 502 and/or in response to a determination that the historical profile for the follower includes an insufficient quantity of comments, social media posts, or both comments and social media posts to determine whether the follower will author a set of positive comments or a set of negative comments on the social media page 500 and/or social media post 502. In further additional or alternative embodiments, an estimation module 410 can estimate a negative response for the follower in response to a nexus of an analysis of the content of the social media page 500 and/or social media post 502 and a historical profile for the follower indicating that the follower will author a set of negative comments on the social media page 500 and/or social media post 502.

A nexus between the analysis of the content of the social media page 500 and/or social media post 502 and a historical profile for a follower can be determined using any suitable technique and/or algorithm that can estimate how a particular follower will respond or is likely to respond (e.g., with a high degree and/or amount of probability) with a positive response, a neutral response, or a negative response to the content of a social media page 500 and/or social media post 502. In some embodiments, an estimation module 410 estimates the response of a follower utilizing a deep learning algorithm to determine and or calculate a nexus between the analysis of the content of the social media page 500 and/or social media post 502 and a historical profile for the follower.

A deep learning algorithm may include any suitable neural networking algorithm that can estimate a follower's response to a current social media page 500 and/or current social media post 502 based on an analysis of the content of the social media page 500 and/or social media post 502 and a historical profile for a follower. Further, a neural networking algorithm may include a supervised or semi-supervised neural networking algorithm.

In some embodiments, the neural networking algorithm includes IBM Watson® by International Business Machines (IBM) Corporation of Armonk, N.Y. In additional or alternative embodiments, a neural networking algorithm and/or deep learning algorithm can include a pre-processing engine that estimates a follower's response based on the comment(s) provided by the follower in one or more previous social media pages 500 and/or social media posts 502 and uses the comment(s) to estimate the follower's response to the current social media page 500 and/or current social media post 502.

A notification module 412 may include any suitable hardware and/or software that can provide notice to a follower. In various embodiments, a notification module 412 is configured to notify a follower of the access permission assigned to the follower. For example, the notification module 412 can notify a particular follower that the follower is assigned a full write permission to a social media page 500 and/or social media post 502, a partial write permission to the social media page 500 and/or social media post 502, and/or a no write permission to the social media page 500 and/or social media post 502. Further, the notification module 412 can notify the follower that the follower has read permission to the social media page 500 and/or social media post 502.

Referring to FIG. 5A, FIG. 5A is a block diagram illustrating one non-limiting example of a social media page 500A. The social media page 500A includes, among other components, one or more social media posts 502 and a set of comments 504 about the social media page 500A and/or the social media post(s) 502.

A social media post 502 may include any suitable data and/or information that is known or developed in the future that an owner of the social media page 500A and/or owner device 104 can author and/or display on the social media page 500A. A comment 504 can include any type of comment that is known or developed in the future that can be authored by a follower and/or a follower device 106.

At least in the illustrated example, the social media page 500A and/or the social media post(s) 502 include four followers (e.g., follower A, follower B, follower C, and follower D). Other examples, may include a smaller quantity of followers or a greater quantity of followers than four followers. In other words, the social media page 500A and/or social media post(s) 502 may include any suitable quantity of followers.

Here, follower A, follower B, follower C, and follower D each have read access to the social media page 500A and/or social media post(s) 502. Further, followers A through D each have the ability to provide and/or post comments 504 about the social media page 500A and/or social media post(s) 502.

In the example of FIG. 5A, follower A posts the comment 504A, which reads: "INTERESTING, I GUESS." Comment 504A may be determined and/or considered a neutral comment and/or a comment that has a neutral impact on the owner of the social media page 500A because it conveys neither a completely positive attitude or a completely negative attitude toward the content/subject matter of the social media page 500A, social media post(s) 502, and/or the owner.

Further, follower B posts the comment 504B, which reads: "SWEET LANDSCAPE PICS!" Comment 504B may be determined and/or considered a positive comment 504 and/or a comment 504 that has a positive impact on the owner of the social media page 500A because it conveys a positive attitude toward the content/subject matter of the social media page 500A, social media post(s) 502, and/or the owner.

In addition, follower C posts the comment 504C, which reads: "YOU NEED PHOTOGRAPHY LESSONS." Comment 504C may be determined and/or considered a negative comment and/or a comment that has a positive impact on the owner of the social media page 500A because it conveys a negative attitude toward the content/subject matter of the social media page 500A, social media post(s) 502, and/or the owner.

Moreover, follower D posts the comment 504D, which reads: "NEVER BEEN THERE BEFORE." Comment 504D may be determined and/or considered a neutral comment and/or a comment that has a neutral impact on the owner of the social media page 500A because it conveys neither a completely positive attitude or a completely negative attitude toward the content/subject matter of the social media page 500A, social media post(s) 502, and/or the owner.

In the example of FIG. 5A, each comment 504 is posted because followers A through D each have write access and/or the ability to provide comments 504A through 504D on the social media page 500A, even though comment 504C may have a negative impact on the reputation, brand, and/or image of the owner of the social media page 500A and comment 504A may potentially damage the reputation, brand, and/or image of the owner of the social media page 500A. To protect the reputation, brand, and/or image of the owner of the social media page 500A, the various embodiments discussed herein can allow, limit, and/or deny the ability of one or more of the follower(s) A through D to access a social media page 500 and/or social media post 502.

With reference to FIG. 5B, FIG. 5B is a block diagram illustrating a non-limiting example of a social media page 500B that can protect the reputation, brand, and/or image of the owner of the social media page 500B. At least in the example illustrated in FIG. 5B, followers A through D are each assigned a read permission for the social media page 500B and the social media post(s) 502.

A read permission, in various embodiments, can be a default permission given to any follower and/or to every follower. In alternative embodiments, a read permission can be assigned, limited, and/or denied to a follower based on the positive impact, neutral impact, and/or negative impact on the owner similar to the various embodiments discussed herein that can assign a full write permission, a partial write permission, and/or a no write permission to a follower. For example, the ability of a follower to read one or more types of social media posts 502 and/or social media posts 502 including one or more types of content and/or subject matter can be provided with full read permission, limited/partial read permission, and/or a denial of the ability to read the social media post(s) 502.

In the example of FIG. 5B, follower B is assigned a full write permission in response to a determination that the follower B will post or is likely to post a comment 504B about the social media page 500A, social media post(s) 502, and/or the owner that will have a positive impact on the owner (e.g., a positive impact on the reputation, brand, and/or image of the owner). As such, the follower B is provided with the ability to write the comment 504B and/or one or more other comments 504.

Follower D, in this example, is assigned a partial write permission in response to a determination that the follower D will post or is likely to post a comment 504D about the social media page 500A, social media post(s) 502, and/or the owner that will have a neutral impact on the owner (e.g., a neutral impact on the reputation, brand, and/or image of the owner). As such, the follower D is provided with the ability to write a limited quantity of comments and/or the comment 504D may be limited in the quantity of words and/or characters included therein. For example, the follower D may be limited to 10 words and/or 100 characters, among other quantities that are possible and contemplated herein.

In this example, follower A is also assigned a partial write permission in response to a determination that there is insufficient data and/or information about the follower A with respect to the content of the social media page 500A and/or social media post(s) 502 and/or about the owner to made a determination of whether the follower A will and/or is likely to post a comment 504 that will have a positive impact or a negative impact on the owner. As such, the follower A is provided with the ability to write a limited quantity of comments and/or the comment may be limited in the quantity of words and/or characters included therein. For example, the follower A may be limited to 1 word and/or 12 characters, among other quantities that are possible and contemplated herein, as illustrated by comment 504A'.

Follower C is assigned a no write permission in response to a determination that the follower C will post or is likely to post a comment about the social media page 500A, social media post(s) 502, and/or the owner that will have a negative impact on the owner (e.g., a negative impact on the reputation, brand, and/or image of the owner). As such, the follower C is denied the ability to write any comments (e.g., cannot write the comment 504C to the social media page 500A in FIG. 5A) to the social media page 500B.

While FIG. 5B illustrates one example of a social media page 500B that can protect the reputation, brand, and/or image of the owner, the various embodiments of the social media page 500B are not limited to this example. That is, other embodiments of a social media page 500B can include any of the various embodiments discussed herein and/or other numerous examples of a social media page 500 that can protect the reputation, brand, and/or image of the owner based on the various embodiments.

Figure 6:
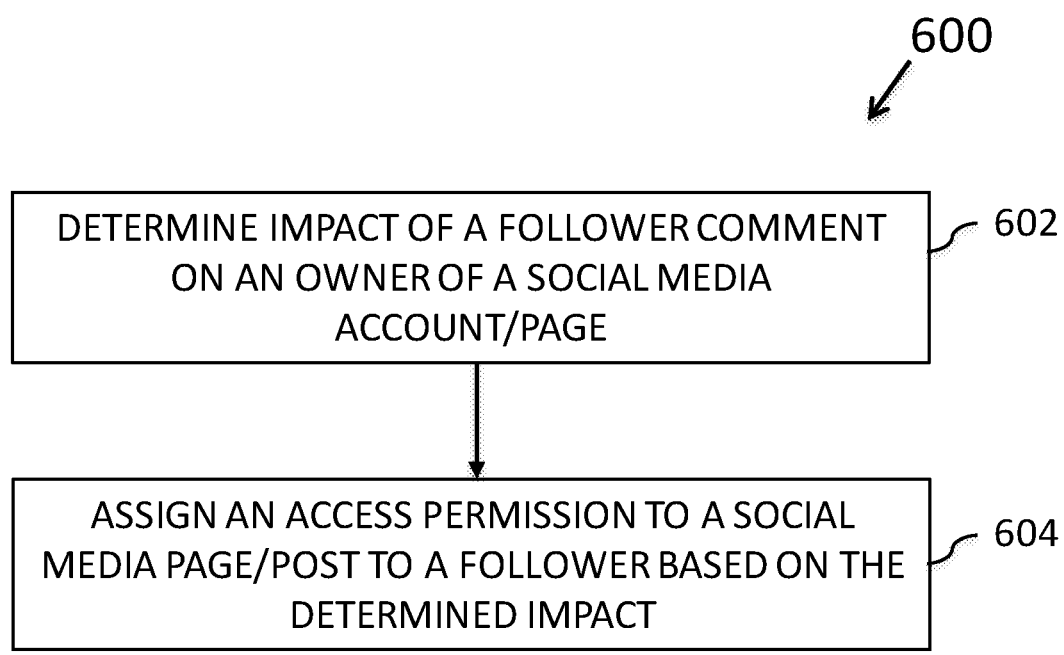
FIG. 6 is a schematic flow chart diagram illustrating one embodiment of a method for assigning access permission to social media.

Referring to FIG. 6, FIG. 6 is a schematic flow chart diagram illustrating one embodiment of a method 600 for assigning an access permission to a social media page 500 and/or social media post 502. At least in the illustrated embodiment, the method 600 begins by a processor 208 determining an impact, on the owner of a social media account and/or social media page 500, of a comment made by a follower about the social media page 500 and/or a social media post 502 on the social media page 500 (block 602). The impact may be a positive impact, a neutral impact, or a positive impact, among other impacts that are possible and contemplated herein, as discussed elsewhere herein. Further, the determined impact can be related to the reputation, brand, and/or image of the owner, as further discussed elsewhere herein.

The processor 208 further assigns one of a plurality of access permissions to the follower for accessing the social media page 500 and/or social media post 502 based on the determined impact (block 604). The access permission can include a read permission and/or a write permission. The access permission can include a full access permission (full read and/or write permission), a partial access permission (e.g., partial read and/or write permission), and/or a no access permission (e.g., a no read and/or a no write permission), among other access permissions that are possible and contemplated herein, as discussed elsewhere herein.

Figure 7:
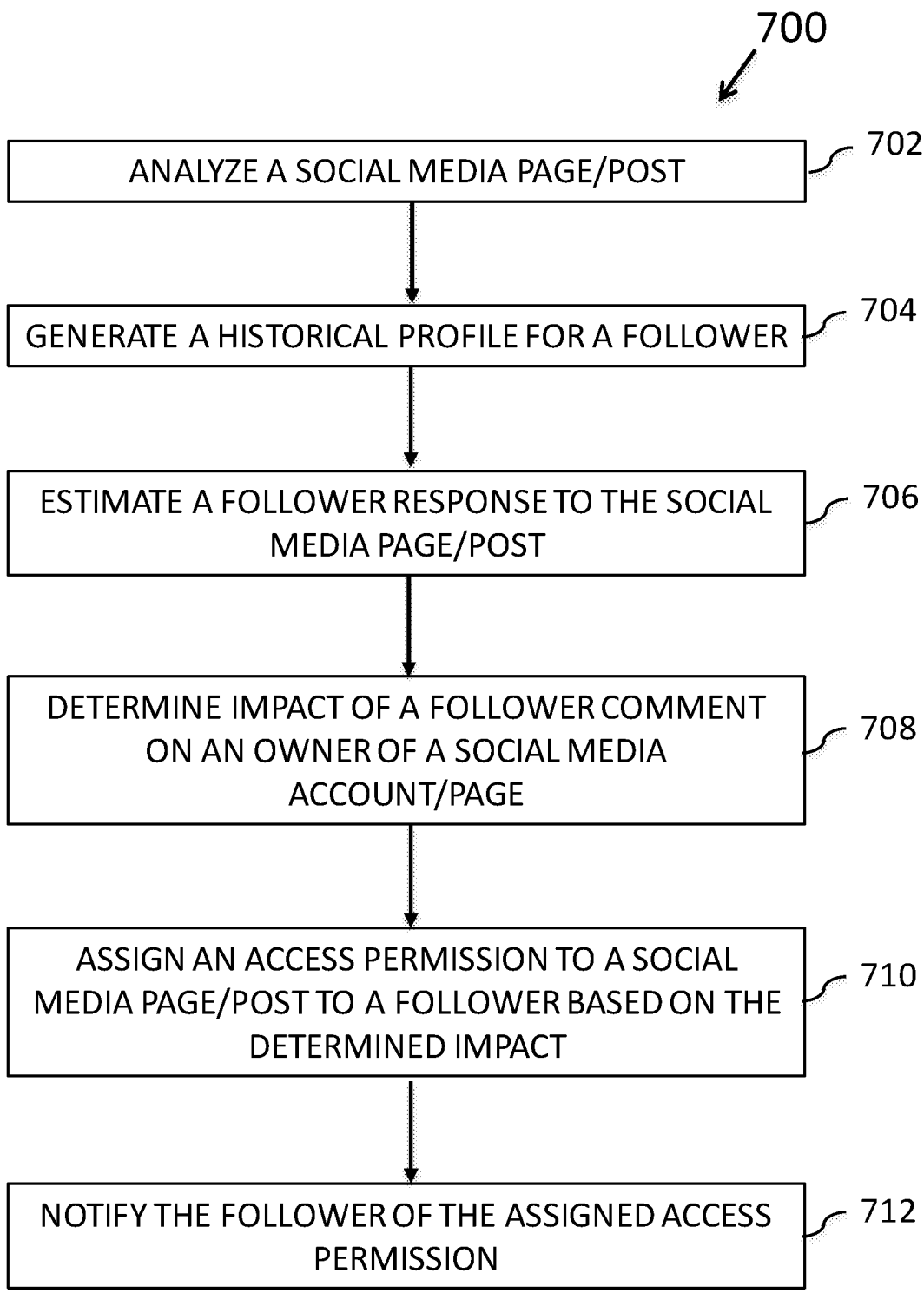
FIG. 7 is a schematic flow chart diagram illustrating another embodiment of a method for assigning access permission to social media.

With reference to FIG. 7, FIG. 7 is a schematic flow chart diagram illustrating another embodiment of a method 700 for assigning an access permission to a social media page 500 and/or social media post 502. At least in the illustrated embodiment, the method 700 begins by a processor 208 analyzing the social media page 500 and/or social media post 502 (block 702). The processor 208 analyzes the content of the social media page 500 and/or social media post 502 to determine whether the content will elicit or is likely to elicit a positive response, a neutral response, and/or a positive response from a follower, as discussed elsewhere herein. In addition, the analysis can be based on the content of the social media page 500 and/or social media post 502 and/or the scope of visibility of the social media page 500 and/or social media post 502, as further discussed elsewhere herein.

The method 700 further includes the processor 208 generating a historical profile for the follower (block 704). The historical profile can be based on a set of previous comments authored by the follower related to a subject matter of the social media page 500 and/or social media post 502 and/or a set of previous social media posts authored by the follower related to the subject matter of the social media page 500 and/or social media post 502, as discussed elsewhere herein.

In various embodiments, the processor 208 estimates a follower response to the social media page 500 and/or social media post 502 (block 706). In various embodiments, the processor 208 estimates a positive response, a neutral response, and a negative response for the follower. Further, the estimated response can be based on a nexus of the analysis of the content of the social media page 500 and/or social media post 502 and the historical profile for the follower, as discussed elsewhere herein. In some embodiments, a positive response is estimated for the follower in response to the nexus of the analysis and the historical profile for the follower indicating that the follower will author a set of positive comments on the social media page 500 and/or social media post 502. A neutral response is estimated for the follower in response to the nexus of the analysis and the historical profile for the follower indicating that the follower will author a set of neutral comments on the social media post and/or the historical profile includes an insufficient quantity of comments and/or quantity of social media posts to determine whether the follower will author a set of positive comments or a set of negative comments on the social media post. A negative response is estimated for the follower in response to the nexus of the analysis and the historical profile for the follower indicating that the follower will author a set of negative comments on the social media page 500 and/or social media post 502.

The processor 208 further determines an impact, on the owner of a social media account and/or social media page 500, of a comment made by a follower about the social media page 500 and/or a social media post 502 on the social media page 500 (block 708). The impact may be a positive impact, a neutral impact, or a positive impact, among other impacts that are possible and contemplated herein. For example, a positive impact can be determined in response to an estimated positive response from the follower, a neutral impact can be determined in response to an estimated neutral response from the follower, and negative impact can be determined in response to an estimated negative response from the follower about the social media page 500 and/or social media post 502.

In addition, the processor 208 assigns one of a plurality of access permissions to the follower for accessing the social media page 500 and/or social media post 502 based on the determined impact (block 710). The access permission can include a read permission and/or a write permission. The access permission can include a full access permission (e.g., full read and/or write permission), a partial access permission (e.g., partial read and/or write permission), and/or a no access permission (e.g., a no read and/or a no write permission), among other access permissions that are possible and contemplated herein, as discussed elsewhere herein.

The method 700 can further and/or optionally include the processor 208 notifying the follower which access permission of the plurality of access permissions is assigned to the follower (block 712). Further, the follower can be notified what read and/or write abilities on the social media page 500 and/or social media post 502 that the access permission allows, limits, and/or denies to the follower.

Figure 8:
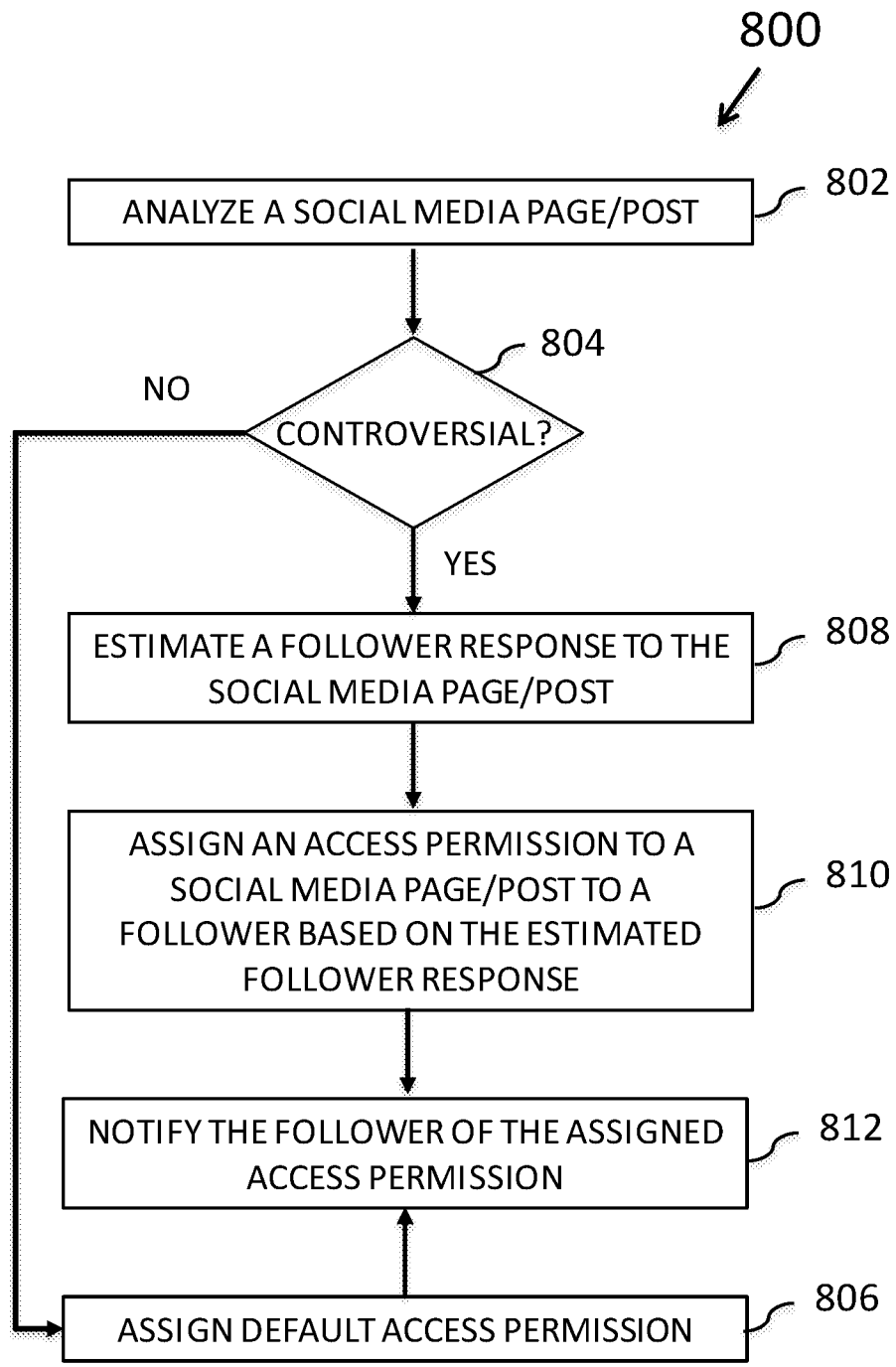
FIG. 8 is a schematic flow chart diagram illustrating yet another embodiment of a method for assigning access permission to social media.

Referring to FIG. 8, FIG. 8 is a schematic flow chart diagram illustrating yet another embodiment of a method 800 for assigning an access permission to a social media page 500 and/or social media post 502. At least in the illustrated embodiment, the method 800 begins by a processor 208 analyzing the social media page 500 and/or social media post 502 (block 802).

The processor 208 analyzes the social media page 500 and/or social media post 502 to determine whether the social media page 500 and/or social media post 502 includes controversial content and/or subject matter (block 804). Controversial content and/or subject matter can be determined utilizing any of the techniques and/or rules discussed elsewhere herein.

In response to a determination that the social media page 500 and/or social media post 502 does not include controversial content and/or subject matter (e.g., a "NO" in block 804), the processor 208 assigns the follower a default access permission to the social media page 500 and/or social media post 502 (block 806). The default access permission can be any suitable access permission to the social media page 500 and/or social media post 502. In some embodiments, the default access permission includes a full read and/or write access permission, among other access permissions that are possible and contemplated herein.

In response to a determination that the social media page 500 and/or social media post 502 includes controversial content and/or subject matter (e.g., a "YES" in block 804), the processor 208 estimates a follower response to the social media page 500 and/or social media post 502 (block 808). In various embodiments, the processor 208 estimates a positive response, a neutral response, and a negative response for the follower. Further, the estimated response can be based on a nexus of the analysis of the content of the social media page 500 and/or social media post 502 and one or more previous comments and/or posts authored by the follower related to the content and/or subject matter of the social media page 500 and/or social media post 502, as discussed elsewhere herein.

In addition, the processor 208 assigns one of a plurality of access permissions to the follower for accessing the social media page 500 and/or social media post 502 based on the estimated follower response (block 810). The access permission can include a read permission and/or a write permission. The access permission can include a full access permission (e.g., full read and/or write permission), a partial access permission (e.g., partial read and/or write permission), and/or a no access permission (e.g., a no read and/or a no write permission), among other access permissions that are possible and contemplated herein, as discussed elsewhere herein. For example, the processor 208 may assign a full access permission to a follower in response to a positive response, a partial access permission to the follower in response to a neutral response, and a no access permission to the follower in response to a negative response estimated for the follower.

The method 800 can further and/or optionally include the processor 208 notifying the follower which access permission of the plurality of access permissions is assigned to the follower (block 812). Further, the follower can be notified what read and/or write abilities on the social media page 500 and/or social media post 502 that the access permission allows, limits, and/or denies to the follower.

The embodiments may be practiced in other specific forms. The described embodiments are to be considered in all respects only as illustrative and not restrictive. The scope of the technology is, therefore, indicated by the appended claims rather than by the foregoing description. All changes which come within the meaning and range of equivalency of the claims are to be embraced within their scope.

What is claimed is:

1. An apparatus, comprising:
a processor; and
a memory storing executable-instructions that, when executed by the processor, causes the processor to implement:
an estimation module that utilizes a deep learning algorithm to estimate a follower response to a particular content of a social media post by a follower, the estimated follower response based on a nexus of a historical profile generated for the follower related to the particular content of the social media post;
an impact module that determines a potential impact of a plurality of potential impacts on the owner of the social media post including the particular content based on the estimated follower response, the potential impact based on a prediction of whether the follower response will include one or more positive comments or one or more negative comments about the particular content of the social media post and how a corresponding positive potential impact or negative potential impact will affect a reputation of the owner of the social media post responsive to the one or more positive comments or one or more negative comments about the particular content submitted by the follower should the one or more positive comments or one or more negative comments be actually posted to the social media post; and
a permission module that assigns a permission of a plurality of permissions to the follower for accessing the social media post, wherein the assigned permission corresponds to the determined potential impact on the reputation of the owner of the social media post,
wherein: the historical profile generated for the follower related to the particular content of the social media post is based on a set of previous comments made by the follower related to the particular content of the social media post gathered from one or more external resources,
the historical profile generated for the follower is included in one of a positive container including positive impacts for positively building a reputation, a neutral container including neutral impacts on the reputation, or a negative container including negative impacts on the reputation corresponding to an attitude of the follower towards the particular content of the social media post,
the positive container is assigned a read-full write permission for the historical profile, the neutral container is assigned a read-partial write permission for the historical profile, and the negative container that is assigned a read-no write permission for the historical profile to allow the follower to post a comment to social media based on the container within which the historical profile for the follower is included and the permission assigned to the follower, and
at least two permissions in the plurality of permissions correspond to different estimated responses.

2. The apparatus of claim 1, wherein:
the plurality of impacts comprises at least a positive impact, a neutral impact, and a negative impact;
the plurality of permissions comprises at least a full write permission to comment on the social media post, a partial write permission to comment on the social media post, and a no write permission to comment on the social media post; and
the full write permission is assigned to the follower in response to the positive impact, the partial write permission is assigned to the follower in response to the neutral impact, and the no write permission is assigned to the follower in response to the negative impact.

3. The apparatus of claim 1, further comprising:
an analysis module that analyzes the social media post based on one of a content of the social media post, a scope of visibility of the social media post, and both the content and the scope of visibility of the social media post.

4. The apparatus of claim 3, further comprising:
a profile module that generates the historical profile for the follower,
wherein the historical profile is further based on one of a set of previous comments authored by the follower related to a subject matter of the social media post, a set of previous social media posts authored by the follower related to the subject matter of the social media post, and both the set of previous comments and the set of previous social media posts authored by the follower related to the subject matter of the social media post provided to an internal resource.

5. The apparatus of claim 4, further comprising:
an estimation module that estimates a response of a plurality of responses for the follower based on a further nexus of the analysis of the social media post and the historical profile for the follower.

6. The apparatus of claim 5, wherein:
the plurality of responses comprises at least a positive response, a neutral response, and a negative response.

7. The apparatus of claim 5, wherein:
a positive response in the plurality of responses is estimated for the follower in response to the further nexus of the analysis and a first historical profile for the follower indicating that the follower will author a set of positive comments on the social media post;
a neutral response in the plurality of responses is estimated for the follower in response to the further nexus of the analysis and a second historical profile for the follower indicating one of:
the follower will author a set of neutral comments on the social media post,
the second historical profile includes an insufficient quantity of comments, social media posts, or both comments and social media posts to determine whether the follower will author a set of positive comments or a set of negative comments on the social media post, and
both the follower will author the set of neutral comments on the social media post and the second historical profile includes the insufficient quantity of comments, the insufficient quantity of social media posts, or both the insufficient quantity of comments and the insufficient quantity of social media posts; and
a negative response in the plurality of responses is estimated for the follower in response to the further nexus of the analysis and a third historical profile for the follower indicating that the follower will author a set of negative comments on the social media post.

8. The apparatus of claim 7, wherein:
the plurality of impacts comprises at least a positive impact, a neutral impact, and a negative impact; and
the impact module is further configured to:
    determine the positive impact for the owner in response to the estimated positive response,
    determine the neutral impact for the owner in response to the estimated neutral response, and
    determine the negative impact for the owner in response to the estimated negative response.

9. The apparatus of claim 8, wherein:
the plurality of permissions comprises at least a full write permission, a partial write permission, and a no write permission; and
the full write permission is assigned to the follower in response to the positive impact, the partial write permission is assigned to the follower in response to the neutral impact, and the no write permission is assigned to the follower in response to the negative impact.

10. The apparatus of claim 1, further comprising:
a notification module that notifies the follower which permission of the plurality of permissions is assigned to the follower.

11. A method, comprising:
estimating, by a processor utilizing a deep learning algorithm, a follower response to a particular content of a social media post by a follower, the estimated follower response based on a nexus of a historical profile generated for the follower related to the particular content of the social media post;
determining, by the processor, a potential impact of a plurality of potential impacts on the owner of the social media post including the particular content based on the estimated follower response, the potential impact based on a prediction of whether the follower response will include one or more positive comments or one or more negative comments about the particular content of the social media post and how a corresponding positive potential impact or negative potential impact will affect a reputation of the owner of the social media post responsive to the one or more positive comments or one or more negative comments about the particular content submitted by the follower should the one or more positive comments of one or more negative comments be actually posted to the social media post; and assigning, by the processor, a permission of a plurality of permissions to the follower for accessing the social media post, wherein the assigned permission corresponding corresponds to the determined potential impact on the reputation of the owner of the social media post,
wherein: the historical profile generated for the follower related to the particular content of the social media post is based on a set of previous comments made by the follower related to the particular content of the social media post gathered from one or more external resources,
the historical profile generated for the follower is included in one of a positive container including positive impacts for positively building a reputation, a neutral container including neutral impacts on the reputation, or a negative container including negative impacts on the reputation corresponding to an attitude of the follower towards the particular content of the social media post,
the positive container is assigned a read-full write permission for the historical profile, the neutral container is assigned a read-partial write permission for the historical profile, and the negative container that is assigned a read-no write permission for the historical profile to allow the follower to post a comment to social media based on the container within which the historical profile for the follower is included and the permission assigned to the follower, and
at least two permissions in the plurality of permissions correspond to different estimated responses.

12. The method of claim 11, further comprising:
analyzing the social media post based on one of a content of the social media post, a scope of visibility of the social media post, and both the content and the scope of visibility of the social media post.

13. The method of claim 12, further comprising:
generating the historical profile for the follower,
wherein the historical profile is further based on one of a set of previous comments authored by the follower related to a subject matter of the social media post, a set of previous social media posts authored by the follower related to the subject matter of the social media post, and both the set of previous comments and the set of previous social media posts authored by the follower related to the subject matter of the social media post provided to an internal resource.

14. The method of claim 13, further comprising:
estimating one of a positive response, a neutral response, and a negative response for the follower based on a further nexus of the analysis of the social media post and the historical profile for the follower, wherein:
    the positive response is estimated for the follower in response to the further nexus of the analysis and a first historical profile for the follower indicating that the follower will author a set of positive comments on the social media post,
    the neutral response is estimated for the follower in response to the further nexus of the analysis and a second historical profile for the follower indicating one of:
        the follower will author a set of neutral comments on the social media post,
        the second historical profile includes an insufficient quantity of comments, social media posts, or both comments and social media posts to determine whether the follower will author a set of positive comments or a set of negative comments on the social media post, and
        both the follower will author the set of neutral comments on the social media post and the second historical profile includes the insufficient quantity of comments, the insufficient quantity of social media posts, or both the insufficient quantity of comments and the insufficient quantity of social media posts, and
    the negative response is estimated for the follower in response to the further nexus of the analysis and a third historical profile for the follower indicating that the follower will author a set of negative comments on the social media post;
determining, for the owner, one of:
    the positive impact in response to the estimated positive response,
    the neutral impact in response to the estimated neutral response, and the negative impact in response to the estimated negative response; and
assigning, to the follower, one of:
a full write permission to comment on the social media post in response to the positive impact,
a partial write permission to comment on the social media post in response to the neutral impact, and
a no write permission to comment on the social media post in response to the negative impact.

15. The method of claim 11, further comprising:
notifying the follower which permission of the plurality of permissions is assigned to the follower.

16. A computer program product comprising a non-transitory computer-readable storage medium including program instructions embodied therewith, the program instructions executable by a processor to cause the processor to:
estimate, utilizing a deep learning algorithm, a follower response to a particular content of a social media post by a follower, the estimated follower response based on a nexus of a historical profile generated for the follower related to the particular content of the social media post;
determine a potential impact of a plurality of potential impacts on the owner of the social media post including the particular content based on the estimated follower response, the potential impact based on a prediction of whether the follower will include one or more positive comments or one or more negative comments about the particular content of the social media post and how a corresponding positive potential impact or negative potential impact will affect a reputation the owner of the social media post responsive to the one or more positive comments or one or more negative comments about the particular content submitted by the follower should the one or more positive comments or one or more negative comments be actually posted to the social media post; and
assign a permission of a plurality of permissions to the follower for accessing the social media post, wherein the assigned permission corresponds to the determined potential impact on the reputation of the owner of the social media post,
wherein: the historical profile generated for the follower related to the particular content of the social media post is based on a set of previous comments made by the follower related to the particular content of the social media post gathered from one or more external resources,
the historical profile generated for the follower is included in one of a positive container including positive impacts for positively building a reputation, a neutral container including neutral impacts on the reputation, or a negative container including negative impacts on the reputation corresponding to an attitude of the follower towards the particular content of the social media post,
the positive container is assigned a read-full write permission for the historical profile, the neutral container is assigned a read-partial write permission for the historical profile, and the negative container that is assigned a read-no write permission for the historical profile to allow the follower to post a comment to social media based on the container within which the historical profile for the follower is included and the permission assigned to the follower, and
at least two permissions in the plurality of permissions correspond to different estimated responses.

17. The computer program product of claim 16, wherein the program instructions further cause the processor to:
analyze the social media post based on one of a content of the social media post, a scope of visibility of the social media post, and both the content and the scope of visibility of the social media post.

18. The computer program product of claim 17, wherein the program instructions further cause the processor to:
generate the historical profile for the follower,
wherein the historical profile is further based on one of a set of previous comments authored by the follower related to a subject matter of the social media post, a set of previous social media posts authored by the follower related to the subject matter of the social media post, and both the set of previous comments and the set of previous social media posts authored by the follower related to the subject matter of the social media post provided to an internal resource.

19. The computer program product of claim 18, wherein the program instructions further cause the processor to:
estimate one of a positive response, a neutral response, and a negative response for the follower based on a further nexus of the analysis of the social media post and the historical profile for the follower, wherein:
the positive response is estimated for the follower in response to the further nexus of the analysis and a first historical profile for the follower indicating that the follower will author a set of positive comments on the social media post,
the neutral response is estimated for the follower in response to the further nexus of the analysis and a second historical profile for the follower indicating one of:
the follower will author a set of neutral comments on the social media post,
the second historical profile includes an insufficient quantity of comments, social media posts, or both comments and social media posts to determine whether the follower will author a set of positive comments or a set of negative comments on the social media post, and
both the follower will author the set of neutral comments on the social media post and the second historical profile includes the insufficient quantity of comments, the insufficient quantity of social media posts, or both the insufficient quantity of comments and the insufficient quantity of social media posts, and
the negative response is estimated for the follower in response to the further nexus of the analysis and a third historical profile for the follower indicating that the follower will author a set of negative comments on the social media post;
determine, for the owner, one of:
the positive impact in response to the estimated positive response,
the neutral impact in response to the estimated neutral response, and
the negative impact in response to the estimated negative response; and
assign, to the follower, one of:
a full write permission to comment on the social media post in response to the positive impact,
a partial write permission to comment on the social media post in response to the neutral impact, and
a no write permission to comment on the social media post in response to the negative impact.

20. The computer program product of claim 16, wherein the program instructions further cause the processor to:
   notify the follower which permission of the plurality of permissions is assigned to the follower.

\* \* \* \* \*